United States Patent [19]

Gourdon et al.

[11] Patent Number: 4,490,712

[45] Date of Patent: Dec. 25, 1984

[54] INFORMATION TRANSCODING PROCESS AND A TRANSMISSION SYSTEM USING SUCH A PROCESS

[75] Inventors: Claude Gourdon; Jean Thivend, both of Conflans Ste Honorine, France

[73] Assignee: Lignes Telegraphiques et Telephoniques, Conflans Ste Honorine, France

[21] Appl. No.: 286,898

[22] Filed: Jul. 27, 1981

[30] Foreign Application Priority Data

Jul. 29, 1980 [FR] France .............................. 80 16708

[51] Int. Cl.³ ............................................. H03K 13/00
[52] U.S. Cl. ................................ 340/347 DD; 375/19
[58] Field of Search .................. 340/347 DD; 375/19; 371/55, 56

[56] References Cited

U.S. PATENT DOCUMENTS 3,783,383 1/1974 Forster .................................. 375/19

*Primary Examiner*—C. D. Miller

*Attorney, Agent, or Firm*—Oblon, Fisher, Spivak, McClelland & Maier

[57] ABSTRACT

A process and system are provided for transmitting additional information, called order track, superimposed on the information to be transmitted, by alteration of the coding law. The process involves:

detection of at least one possible value of the information to be transmitted, for which the coding law is altered depending on the order track information.

The first coding is transformed into a second coding by choice of one of several alphabets capable of ensuring such a transformation, this choice being effected depending on the value of the current numerical sum, in accordance with the coding law such that the value of this numerical sum is minimized.

the output at one end of the transmission channel of the information is expressed in the second coding as altered by the order track.

The information received at the other end of the transmission channel is transformed into information expressed in the first coding.

The order track is detected by detection of the alteration in the coding law.

4 Claims, 3 Drawing Figures

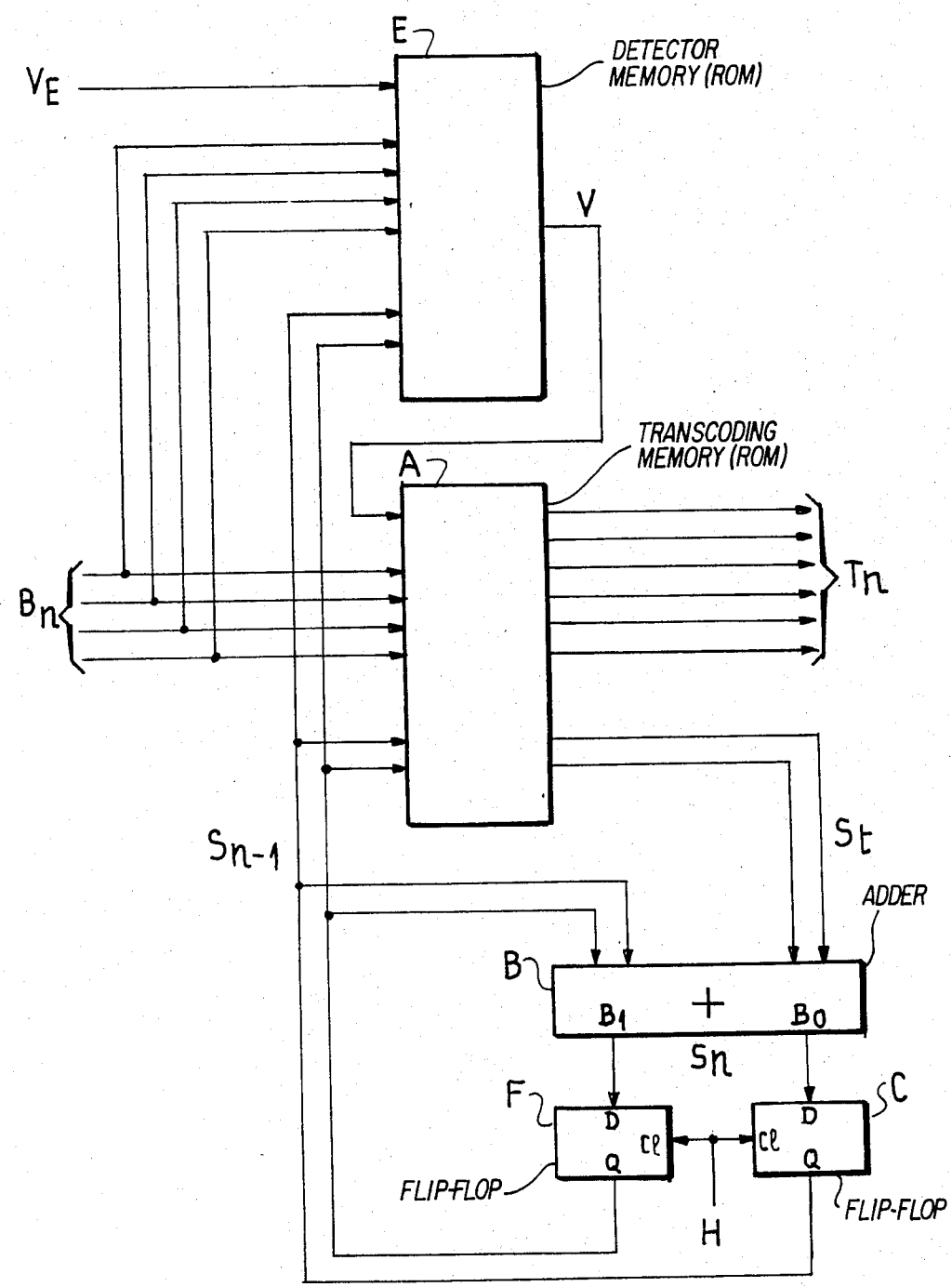

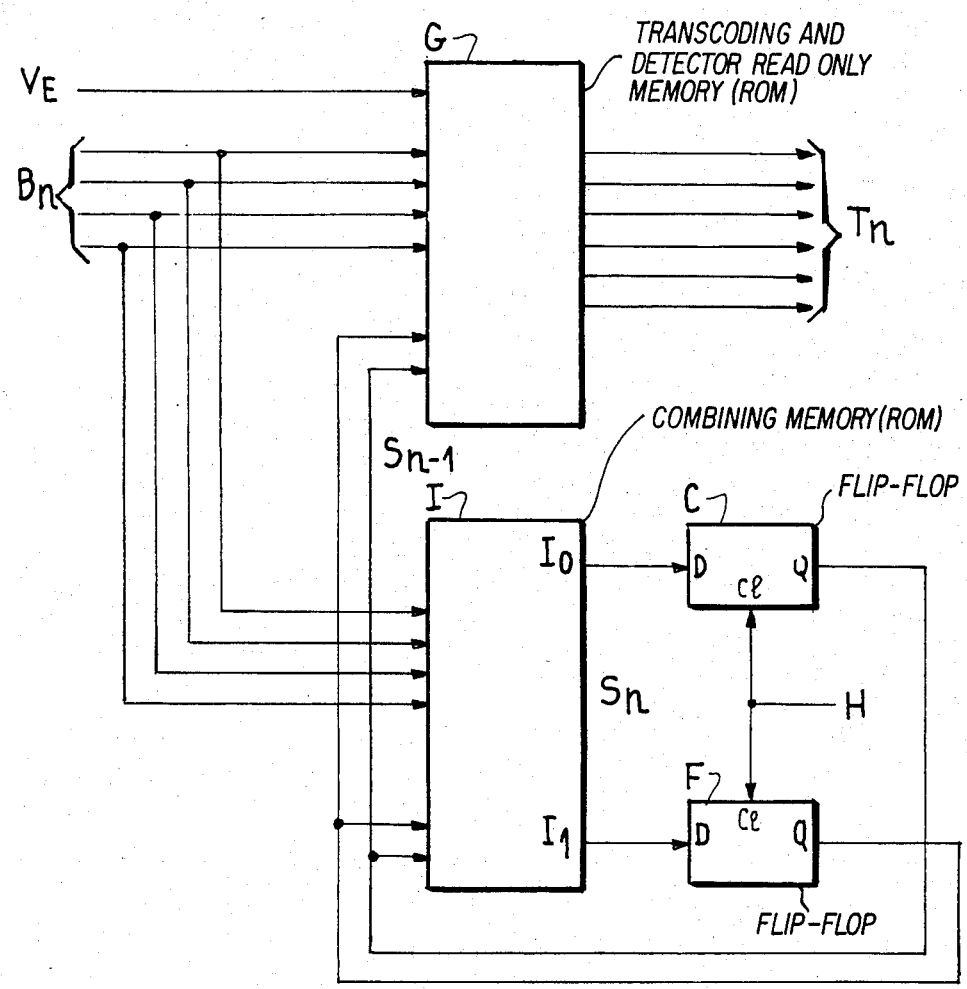

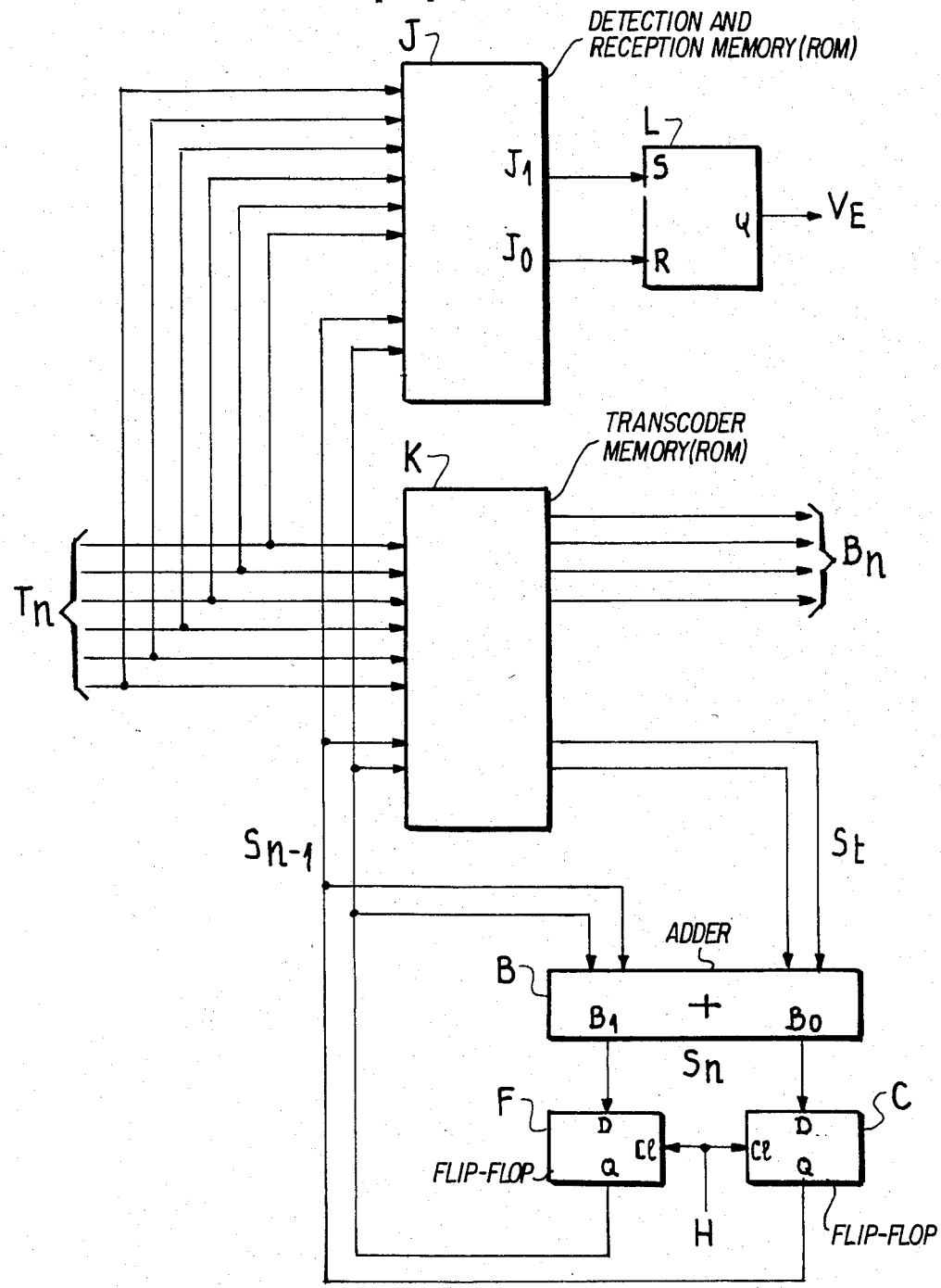

INFORMATION TRANSCODING PROCESS AND A TRANSMISSION SYSTEM USING SUCH A PROCESS

BACKGROUND OF THE INVENTION

1. Field of the Invention

The present invention relates to the information transcoding field and relates more particularly still to a process for transforming a flow of information, binary for example, into a flow of pulses better adapted to the usual transmission media (metal conductor cable, optical fiber cable, etc.); this flow is very often a succession of ternary pulses, i.e. comprising three levels.

The invention also relates to a transmission system for implementing this process.

2. Description of the Prior Art

The problem posed by such transcoding forms the subject of numerous studies, among which may be mentioned by way of example an article by J. Valin, appearing in the Thomson-CSF technical review (Volume II, No. 2, June 1979, page 359); it emerges more especially therefrom that the characteristics desired for a code are: minimization of the passband normally required for correctly transmitting the signal; suppression of the DC component, so as to allow simplification of certain elements of the transmission system; the possibility of having a self-synchronizing process so as to avoid the addition of a special channel for transmitting synchronizing signals, and intrinsic detection of transmission errors. A number of complex codes in particular are known, described more especially in the above-mentioned article, such as ternary, quaternary codes, etc., in which the number of possible combinations is greater than that of the starting code, for example binary. This redundance allows several alphabets to be defined, that is to say that for each possible value of the starting code there correspond several values of the complex code.

A coding law is the concept which allows, for each value of the starting code, that one of the alphabets which will be used to be chosen, depending at least on one criterion which takes into account the whole of the message already transmitted: this criterion is the current numerical sum, which it is recalled is the sum of the values of the symbols of the code between the time t chosen as the beginning of emission and any time t. Now, it is known that limitation of the numerical sum allows more especially the DC component of the transmitted signal to be eliminated: the coding law regulates therefore in general the passage from one alphabet to another with a view to reducing the current numerical sum.

SUMMARY OF THE INVENTION

The present invention relates to the transmission of additional information, forming what is called hereafter an order track, which is superposed on the information to be transmitted. This is accomplished by alteration of the coding law while maintaining as a whole the advantages of this law insofar as the passband, the DC component, etc. are concerned.

An object of the process of the invention is the transcoding of information to be transmitted over a transmission channel, expressed in a first code, and comprises the following operations:

transformation of the first coding into a second coding by choice of one of several alphabets capable of ensuring such transformation, this choice being effected as a function of the value of the current numerical sum, according to a coding law such that the value of this numerical sum is minimized;

detection of at least one possible value of the information to be transmitted, for which the coding law is altered depending on the order track information;

emission at one end of the transmission channel of the information expressed in the second coding and such as altered by the order track;

transformation of the information received at the other end of the transmission channel into information expressed in the first coding;

detection of the order track by detection of the alterations in the coding law.

Another object of the invention is an information transmission system for implementing the above process and comprises to this end an emission module and a reception module placed at each end of a transmission line.

The emission module comprises principally:

means for detecting at least one possible value of the information to be transmitted, expressed in the first coding, for which the coding law is modified, receiving the order track and supplying a signal for modifying this law;

means for elaborating the current numerical sum;

transcoding means receiving the information to be transmitted, the numerical sum and the modification signal and supplying information to be transmitted, expressed in the second coding.

The reception module comprises principally:

transcoding means, receiving the information transmitted and transforming it into information expressed in the first coding;

means for elaborating the current numerical sum, receiving in particular the transmitted information;

means for detecting alterations in the coding law, receiving the information transmitted and the numerical sum and supplying the order track information.

BRIEF DESCRIPTION OF THE DRAWINGS

Other objects, characteristics and results of the invention will become clear from the following description, given by way of nonlimiting example, and illustrated by the accompanying drawings which represent:

FIG. 1, a first embodiment of the transmitting module used in the transmission system of the invention;

FIG. 2, a second embodiment of this transmitting module; and

FIG. 3, an embodiment of the reception module used in the transmission system of the invention.

In these different figures, the same references relate to the same elements.

DESCRIPTION OF THE PREFERRED EMBODIMENTS

These different figures show embodiments of elements of the system of the invention in the case of particular transcoding known under the name 4B/3T, in which the information to be transmitted is expressed in binary form and supplied in the form of four-bit words and the transcoded information, transmitted over the transmission channel, is expressed in the form of three ternary character words, i.e. each character is able to assume one of three values, usually represented by the symbols: "0", "+" and "−".

The table below gives an example of four-alphabet 4B/3T coding, that is to say that for each binary word of four bits, the ternary correspondence takes place by taking a ternary word of three characters in one of the four columns possible. The choice between these columns, and thus between these four alphabets, is made depending on the value of the current numerical sum, i.e. the numerical sum resulting from all the words already transmitted, this sum being made in this case word by word. Referring to the table, there is shown in the first column a binary word $B_n$ occupying a rank n in a given message to be transmitted and the following columns represent a corresponding ternary word $T_n$, expressed in one of the four alphabets and chosen depending on the coding law selected, as a function of the value of the numerical sum $S_{n-1}$ of the n−1 words preceding the word $T_n$.

Each ternary character may of course be represented in binary form by means of two bits, with for example the following convention:

a ternary"+"is represented in binary form by 10;
a ternary"0"is represented in binary form by 00;
a ternary"−"is represented in binary form by 01.

Thus it is possible to represent a ternary word of three characters in binary form by 6 bits.

| BINARY WORD | TERNARY WORD $T_n$ | | | |
|---|---|---|---|---|
| $B_n$ | $S_{n-1} = -2$ | $S_{n-1} = -1$ | $S_{n-1} = 0$ | $S_{n-1} = +1$ |
| 0000 | + − + | + − + | + + − | − − − |
| 0001 | + + + | − + − | − + − | − + − |
| 0010 | 0 + + | 0 + + | 0 − − | 0 − − |
| 0011 | + 0 + | + 0 + | − 0 − | − 0 − |
| 0100 | − + + | − + + | − + + | − − 0 |
| 0101 | + + 0 | + − − | + − − | + − − |
| 0110 | + + − | + + − | − − + | − − + |
| 0111 | 0 0 + | 0 0 + | 0 0 − | 0 0 − |
| 1000 | 0 + 0 | 0 + 0 | − 0 0 | − 0 0 |
| 1001 | + 0 0 | + 0 0 | − 0 0 | − 0 0 |
| 1010 | + 0 − | + 0 − | + 0 − | + 0 − |
| 1011 | + − 0 | + − 0 | + − 0 | + − 0 |
| 1100 | − 0 + | − 0 + | − 0 + | − 0 + |
| 1101 | − + 0 | − + 0 | − + 0 | − + 0 |
| 1110 | 0 + − | 0 + − | 0 + − | 0 + − |
| 1111 | 0 − + | 0 − + | 0 − + | 0 − + |

According to the invention, the coding law represented by the above table is modified so as to allow the transmission of additional information, called order track, in the following way: at least one of the possible $B_n$ words has its coding law altered at least in some cases, for example depending on the value of the numerical sum. The following table is obtained, by way of example, when it is decided to modify the coding law for a single $B_n$ word, for example 1000.

| $B_n$ | Order track | $T_n$ | | | |
|---|---|---|---|---|---|
| | | $S_{n-1} = -2$ | $S_{n-1} = -1$ | $S_{n-1} = 0$ | $S_{n-1} = +1$ |
| 1000 | 0 | 0 + 0 | 0 + 0 | 0 − 0 | 0 − 0 |
| | 1 | — | 0 − 0 | 0 + 0 | — |

It appears from this table, when we compare it with the preceding one, that when the order track information is equal to 0, the coding law is not altered, this alteration only occurring for an order track equal to 1 and only for numerical sum values equal to −1 or 0, this so as to reduce the deviation of this latter in accordance with the above-mentioned criterion.

FIG. 1 shows a first embodiment of the emission module of the transmission system of the invention, adapted to the above-described code.

The emission module comprises a first assembly A, called transcoding means, which is formed by a wired logic circuit or by a memory, for example of the ROM type, which receives the binary word $B_n$ to be transmitted, over 4 parallel bits in the preceding example, as well as the value $S_{n-1}$ of the numerical sum of the n−1 preceding words of the message considered, expressed over two parallel bits; block A also receives information V, over one bit, which represents a possible order for modifying the coding law. Block A supplies, depending on these three elements, the ternary word $T_n$, in general in its binary form for example in accordance with the above-mentioned convention, as well as the numerical sum of this ternary word $T_n$, referenced $S_t$.

The emission module of FIG. 1 further comprises detection means E, receiving the binary word $B_n$ also over four bits, the order track information $V_E$ over one bit, as well as the indication of the numerical sum $S_{n-1}$ over two bits. This block E supplies, as a function of the second table, the preceding information V, i.e. that its function is to recognize the word(s) likely to undergo modification of the coding law depending on the order track, to similarly recognize the value of the numerical sum $S_{n-1}$ and, when the values of $B_n$ and $S_{n-1}$ are suitable, to initiate the order V for modifying the coding law depending on the value (0 or 1) of the input order track information $V_E$. Block E is also formed by a wired logic circuit or memory of the ROM type for example.

The module of FIG. 1 further comprises means for elaborating the numerical sum $S_n$, a new value of this sum after emission of the ternary word $T_n$. In this embodiment, these means are formed by an adder B which receives, on the one hand, the value $S_{n-1}$ and, on the other hand, the value $S_t$ and which supplies at two outputs $B_0$ and $B_1$ the value of $S_n$; these two outputs feed type-D flip-flops, referenced C and F, which make available the value of $S_n$ for the following binary word $B_{n+1}$. Flip-flops C and F comprise conventionally a timing input C1 connected to a central clock H of the module and whose function is to take the state of their input D, which is then available at output Q, on appearance of the clock signal.

The emission module thus described is used in the following way for putting into practice the process of the invention; block E detects the binary value chosen for carrying the order track information, depending on the value of $S_{n-1}$. Block A transforms the binary coding into ternary coding in accordance with the coding law which enables a choice to be made between the four possible alphabets depending on the value of the numerical sum $S_{n-1}$, in accordance with the first table above. This block provides for the emission of information expressed in the ternary coding such as modified by the order V supplied by block E.

FIG. 2 shows a second embodiment of the emission module of the invention. This module comprises a block G, formed from a wired logic circuit or, more simply, from a memory, for example of ROM type; it provides simultaneously the functions of blocks A and E of FIG. 1, i.e. it receives the binary word $B_n$ as well as the sum $S_{n-1}$ and the order track $V_E$ and delivers directly, as a function of the first table above such as modified by the second table, the ternary word $T_n$ expressed in binary form over six bits.

Calculation of the numerical sum $S_n$ from the sum $S_{n-1}$ and from the sum $S_t$ of the word $T_n$ may be achieved either as shown in FIG. 1, i.e. from $S_{n-1}$ and $S_t$ by means of an adder, or as shown in FIG. 2 by a block I, formed by a wired logic circuit or a memory, supplying from $S_{n-1}$ and $B_n$ the new value $S_n$ at two outputs $I_0$ and $I_1$ which feed, as before, flip-flops C and F which maintain available at their outputs the value of the current numerical sum. This embodiment has the advantage of not having to elaborate $S_t$ and avoiding the use of an adder.

FIG. 3 shows an embodiment of the reception module of the transmission system of the invention.

This module comprises transcoding means K, formed for example by a memory or a wired logic circuit, receiving the transmitted ternary word $T_n$, preferably in binary form over six bits and converting it into a binary word $B_n$, expressed over four bits. This block K also supplies, over two bits, the value of the numerical sum of the word $T_n$ considered, referenced $S_t$.

The module further comprises means for elaborating the sum $S_n$ from the values $S_{n-1}$ and $S_t$. These means may be formed similarly to those of FIG. 1, as shown in FIG. 3, by the adder B receiving the two $S_{n-1}$ bits and two $S_t$ bits and being connected by its outputs $B_0$ and $B_1$ respectively to the two flip-flops C and F which supply the value of $S_n$. These means for elaborating $S_n$ may also be formed similarly to what is shown in FIG. 2, i.e. by a block (I) formed from a wired logic circuit or a memory, thus avoiding the step for elaborating $S_t$ and the use of an adder.

The reception module further comprises means for detecting the order track, receiving the ternary word $T_n$ and the numerical sum $S_{n-1}$. These means comprise a block J, formed for example by a wired logic circuit or a memory, supplying information at a first output referenced $J_0$ when the order track is zero, and supplying information at a second output referenced $J_1$ when the order track is equal to 1. These two outputs are connected to an RS-type flip-flop, referenced L, which supplies at its output order track information equal to 0 to 1.

The elements J and K may be combined in a single circuit receiving the information $T_n$ and $S_{n-1}$ and supplying $J_0$, $J_1$ and $B_n$.

The reception module thus described is used as follows for putting the process of the invention into practice:

The received information ($T_n$) expressed in ternary form is transformed into binary form ($B_n$) and this independently of the existence of order track information, which shows that the transmission of the order track does not interfere with the information to be transmitted; the detection of the order track is accomplished by detection of the modifications undergone by the coding law from the ternary word $T_n$ (here: recognition of the value 1000) and depending on the value of $S_{n-1}$ (here: $-1$ or 0), which supplies according to the second table above the value of the order track.

So as to limit errors on the order track, it is necessary for the rapidity of the modulation (RMO) of the order track to be as large as possible with respect to the probability of appearance of the words provided for carrying the order track information. The magnitude RMO is equal to the modulation speed of the system (RMS) divided by M, M being the average number of words separating two words provided for transmitting the order track. That leads to the choice of the number of words capable of carrying the order track information, depending on RMS and on the accepted error rate.

The above description has of course been given by way of nonlimiting example and different variations are possible within the scope of the invention. Thus for example, the alteration of the coding law may be achieved for a single binary word but for all the values of the numerical sum, the binary word then being for example translated by a ternary word assuming a normally forbidden value (for example 000 in the 4B/3T coding table given above) when the order track information is equal to 1. Similarly, transmission processes and systems come within the scope of the invention for transmitting an order track by alteration of the coding law when the transcoding used is different from the 4B/3T example described.

What is claimed is:

1. A process for transcoding information to be transmitted over a transmission channel and expressed in a first code, comprising the steps of:
    transforming information in the first code into a second code by choosing one of a plurality of alphabets capable of insuring such a transformation, said choosing being effected depending on the value of the current numerical sum, in accordance with a coding law whereby the value of said numerical sum is minimized;
    receiving order track information;
    detecting at least one possible value of the information to be transmitted, for which the coding law is altered depending on the value of said order track information;
    outputting at one end of said transmission channel the information expressed in said second code which has been altered by said transmitted order track information;
    transforming of the information received at the other end of said transmission channel into information expressed in said first code;
    detecting of the order track by detecting said alterations in the coding law.

2. The process as claimed in claim 1, wherein the first code is a binary code and the second code is a ternary code.

3. The process as claimed in claim 1, wherein the information expressed in said codes is organized into words comprising a first given number of characters for the first code and a second given number of characters for the second code, the numerical sum being indicated at the end of each word.

4. The process as claimed in claim 1, wherein the alteration in the coding law is made for one of the possible values of a word of the first code, and when said numerical sum assumes at least two values, said alteration being chosen from the lowest of the possible values.

* * * * *